(12) United States Patent
Sayma et al.

(10) Patent No.: US 11,585,607 B2
(45) Date of Patent: Feb. 21, 2023

(54) THERMAL STORAGE APPARATUS

(71) Applicant: City, University of London, London (GB)

(72) Inventors: Abdulnaser Sayma, London (GB); Jafar Al-Zaili, London (GB)

(73) Assignee: City, University of London, London (GB)

( * ) Notice: Subject to any disclaimer, the term of this patent is extended or adjusted under 35 U.S.C. 154(b) by 0 days.

(21) Appl. No.: 17/252,270

(22) PCT Filed: Jun. 11, 2019

(86) PCT No.: PCT/EP2019/065168
§ 371 (c)(1),
(2) Date: Dec. 14, 2020

(87) PCT Pub. No.: WO2019/238653
PCT Pub. Date: Dec. 19, 2019

(65) Prior Publication Data
US 2021/0254903 A1 Aug. 19, 2021

(30) Foreign Application Priority Data
Jun. 13, 2018 (GB) .................. 1809687

(51) Int. Cl.
F28D 15/00 (2006.01)
F28D 20/02 (2006.01)
F28F 3/02 (2006.01)
F28D 20/00 (2006.01)

(52) U.S. Cl.
CPC .............. F28D 20/02 (2013.01); F28F 3/02 (2013.01); *F28D 2020/0008* (2013.01); *F28D 2020/0082* (2013.01)

(58) Field of Classification Search
CPC ............ F28D 20/02; F28D 2020/0008; F28D 2020/0082; F28F 3/02
USPC ...................................... 165/104.21
See application file for complete search history.

(56) References Cited

U.S. PATENT DOCUMENTS

2012/0048768 A1* 3/2012 Holloway .............. C09K 5/063
                                                    206/524.1
2018/0283726 A1* 10/2018 Wetzel .................. F24F 5/0046

* cited by examiner

Primary Examiner — Davis D Hwu
(74) Attorney, Agent, or Firm — Finch & Maloney PLLC

(57) ABSTRACT

A store (1) for thermal energy, the store comprising: a housing (5) defining an internal chamber having an inlet and an outlet; and a plurality of receptacles (7) provided within the internal chamber and spaced from one another so that heat transfer fluid can flow over and around the receptacles (7) as the fluid moves from the inlet to the outlet; wherein each said receptacle (7) defines an internal cavity (9) for the storage of phase change material (PCM) so that thermal energy can transfer between the stored PCM material and the heat transfer fluid as the fluid passes over and between the receptacles.

18 Claims, 2 Drawing Sheets

THERMAL STORAGE APPARATUS

FIELD

This invention relates to thermal storage apparatus, particularly but not exclusively to heat exchangers that incorporate a so-called phase change material (hereafter: "PCM") that is capable of storing energy in the form of thermal energy.

BACKGROUND

PCMs have previously been proposed for use in latent heat storage systems where energy is stored by melting solid material, and energy is released by bringing the molten material back to solid form.

In the context of concentrating solar power plants, often molten salt is used to store the thermal energy and for transferring heat from a solar tower to a steam turbine. Whilst such systems function adequately, they typically require multiple heat exchangers and "hot" and "cold" storage tanks, as well as a source of heat (often electrical) to keep the salt in a molten state on the times when there are low levels of sunshine. This complicates the system, and adds cost—both in terms of construction cost and maintenance cost.

The waste heat recovery from thermal engines for applications such as combined heat and power often use water tanks for thermal storage. Use of PCM thermal energy storage can significantly reduce the size of the thermal storage in comparison with water tanks.

The present invention has been devised with the foregoing in mind.

SUMMARY

In accordance with a presently preferred embodiment of the present invention, there is provided a store for thermal energy, the store comprising: a housing defining an internal chamber having an inlet and an outlet, a plurality of receptacles provided within the internal chamber and spaced from one another so that heat transfer fluids can flow over and around the receptacles as the fluid moves from the inlet to the outlet, wherein each said receptacle defines an internal cavity for the storage of phase change material (PCM) so that thermal energy can transfer between the stored PCM material and the heat transfer fluids as the fluid passes over and between the receptacles.

Each receptacle may include a closable port for accessing the internal cavity for the installation of PCM therein. The store may be stackable so that a plurality of stores may be stacked one of top of another to form an array. The store may be configured so that a plurality of stores may be installed side-by-side. The store is preferably of a heat resistant material, for example a heat resistant alloy (for example, Inconel). The store may be manufactured using an additive manufacturing technique (for example, 3D printing). The heat transfer fluid may comprise a gas, such as air or similar. Preferably the store is configured for storing heat at temperatures between about 100 and 1000 degrees centigrade.

The thermal energy store disclosed herein can be used in many applications, for example in waste heat recovery from industrial variable output sources, in conjunction with upgrading low temperature heat using heat pumps, in conjunction with solar thermal power plants to store thermal energy when the sun is shining and release when there is no sun light or no sufficient sun light to power the prime mover, or integrated with domestic combined heat and power units providing a much better matching between heat and power demand (thereby increasing system utilisation).

Preferred features of aspects of the invention are set out in the dependent claims and elsewhere in the present application.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION

Figure 1:
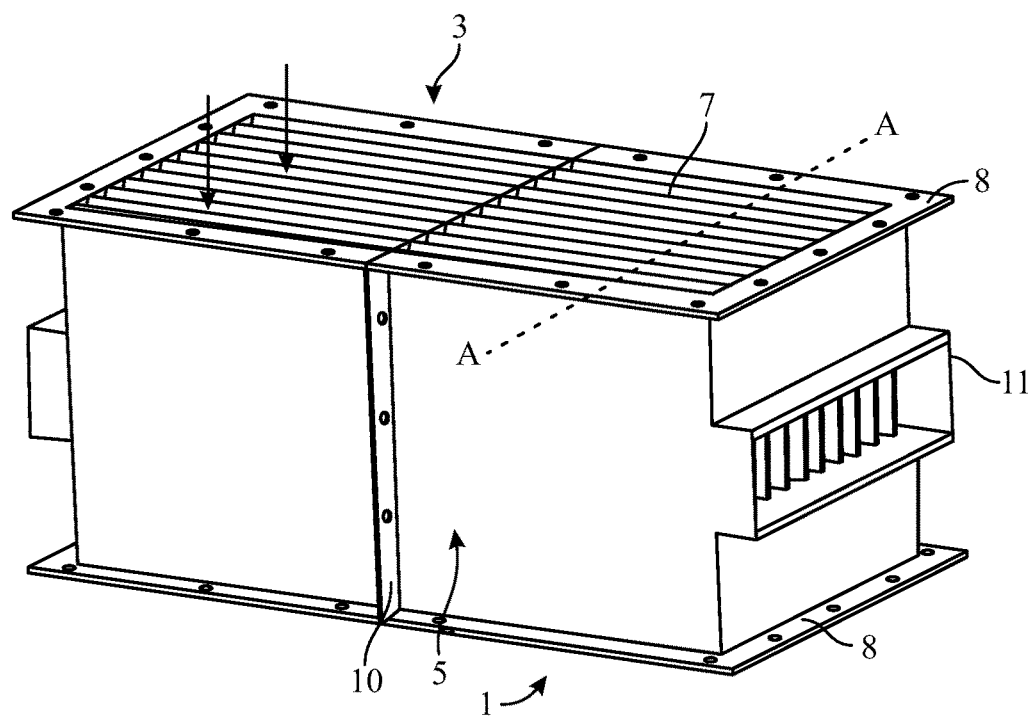
FIG. 1 is a schematic perspective view of two thermal energy stores arranged back to back.
Figure 2:
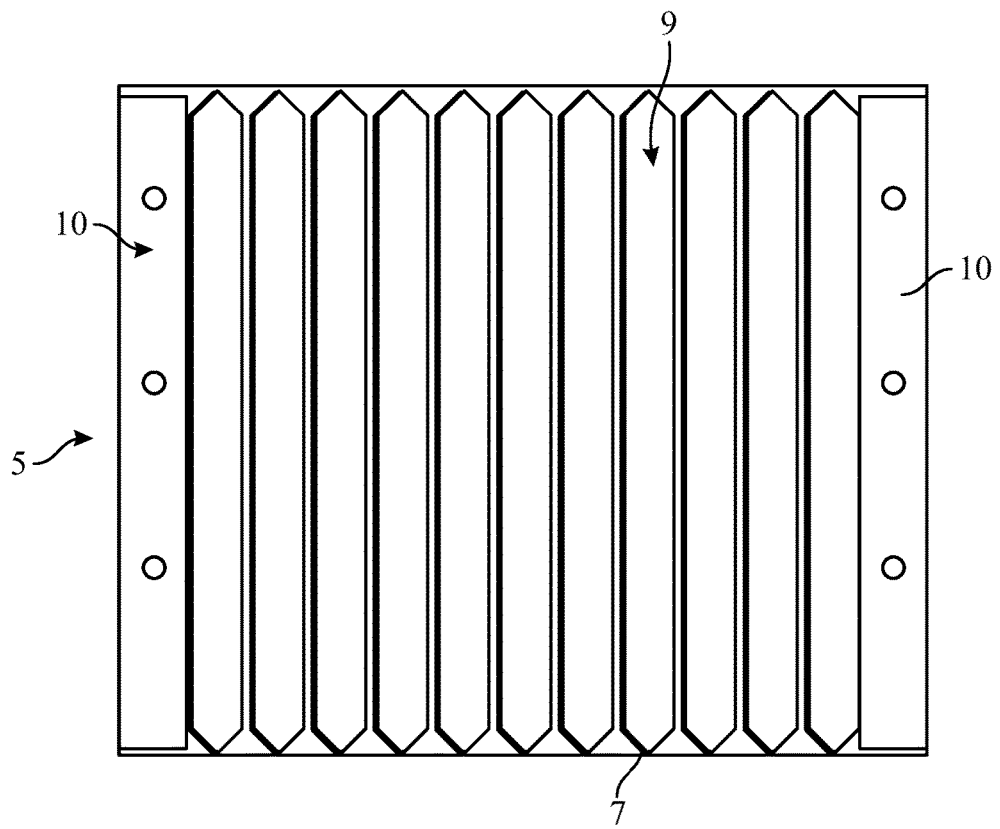
FIG. 2 is a cross-sectional view along the line A-A of FIG. 1.

Referring now to FIGS. 1 and 2, there is depicted a first 1 and a second 3 thermal energy store arranged in a back-to-back configuration. Both thermal energy stores are identical, so for expediency only the first 1 of these is described in detail below.

The energy store comprises a housing 5 formed by four walls that cooperate to define an internal chamber with open top and bottom faces (it being understood that relative terms such as "top" and "bottom" refer to the particular orientation shown in FIG. 1 and are not intended to limit the scope of the invention), the open top and bottom faces functioning as an inlet and an outlet, respectively, for heat transfer fluid (or, as required, as an outlet and an inlet, respectively, for heat transfer fluid).

Within the internal chamber there are provided a plurality of receptacles 7 that are arranged so as to be spaced from one another so that heat transfer fluid, for example air or water, can flow around the receptacles for the transfer of thermal energy between the receptacles and the heat transfer fluid.

The receptacles 7 each define an internal cavity 9 for accommodating a PCM, the nature of which varies according to the particular use to which the energy store is to be put. In one envisaged implementation the receptacles are provided with a measure of PCM (for example they may be filled, at least substantially, with PCM) and then sealed so that access cannot subsequently be had to the receptacle cavities.

In another envisaged implementation, the receptacles 7 are each provided with a port that can be opened and closed to facilitate replacement of the PCM and to allow the energy store to be provided with PCM once located on-site (instead of being filled at the time of manufacture). As shown in FIG. 1, the ports in the receptacles may be accessible via an opening 11 in the housing 5. To install PCM in the energy store, one need only tip the housing 5 so that the opening is uppermost, heat the PCM to a point above its melting point, and then pour the molten PCM into the cavities of each receptacle. The ports in the receptacles can then be sealed and the housing tipped back into its original position.

In another envisaged implementation of the teachings of the invention, a number of receptacles may be coupled together so that PCM can flow between them, a port being provided by means of which PCM can be poured into multiple receptacles. For example, all of the receptacles could be accessed via a single port.

It is also envisaged, for the receptacles to include multiple ports. For example, in an implementation where the receptacles are in an upright orientation, "fill" ports could be provided in an upper part of one or more of the receptacles, and a "drain" port could be provided in a lower part of one or more of the receptacles. This arrangement would be advantageous as gravity would assist the removal of PCM from within the receptacles, as might be needed—for example—if the thermal energy store were to be moved from one location to another, or if the PCM were to be refreshed with new PCM.

As will be appreciated by persons of ordinary skill in the art, the choice of PCM for a given application will depend on the particular thermal requirements of that application. A variety of PCMs exist—such as organic PCMs (e.g. bio-based, paraffin, or carbohydrate and lipid derived), inorganic PCMs (e.g. salt hydrates), inorganic Eutectic PCMs (e.g. c-inorganic, or inorganic-inorganic compounds), hydroscopic PCMs, and solid-solid PCMs; and a person of ordinary skill in the art will readily be able to select whichever of these is appropriate for a given application.

In a particularly preferred implementation of the teachings of the invention, the energy store may be manufactured so that the receptacles and housing are integral with one another, for example by means of an additive manufacturing process such as 3D printing. It is also envisaged for the receptacles to be provided with vanes or fins to enhance energy transfer between the PCM and the heat transfer fluid. It is preferred for the energy store to be of a material that is resistant to heat, for example an alloy such an Inconel.

The housing will typically be coupled to an inlet manifold and an outlet manifold so that heat transfer fluid can efficiently be directed through the energy store (for example from top to bottom as shown in FIG. 1). The energy store may use a common heat transfer fluid pathway for charging and discharging of the store, or separate pathways for charging and discharging. In a preferred implementation, the energy store is suitable for storing heat in a range of temperatures from about 100 degrees to about 1000 degrees.

The thermal energy store can be arranged to contain two separate flow pathways to allow for heat recovery from for example the exhaust gas of an engine. In such an arrangement the PCM is embedded in the thermal energy store to store the heat from the exhaust gas and to release it to the cold flow passing through the second fluid path when needed, In such an arrangement the heat flows in three ways between the hot flow, cold flow and the PCM.

The energy store depicted in FIG. 1 is modular in nature and can be employed with like stores to form an array, either by arranging the stores in parallel (as shown in FIG. 1) or by stacking them one on top of the other so that heat transfer fluid flows through several stores in series. To this end, the stores may comprise externally extending structural formations, for example flanges, 8 at least partly surrounding the inlet and/or outlet, the structural formations including a plurality of through-holes so that neighbouring stores in a stack can be coupled together, for example by means of nuts and bolts. Similarly, the stores may further comprise transverse structural formations 10, for example flanges, that also include a plurality of through-holes so that adjacent stores arranged side-by-side can be coupled together, for example by means of nuts and bolts. This architecture provides a thermal store that can readily be coupled to like stores to form a larger array by stacking stores on top of one another, and/or by coupling them together in parallel.

Figure 3:
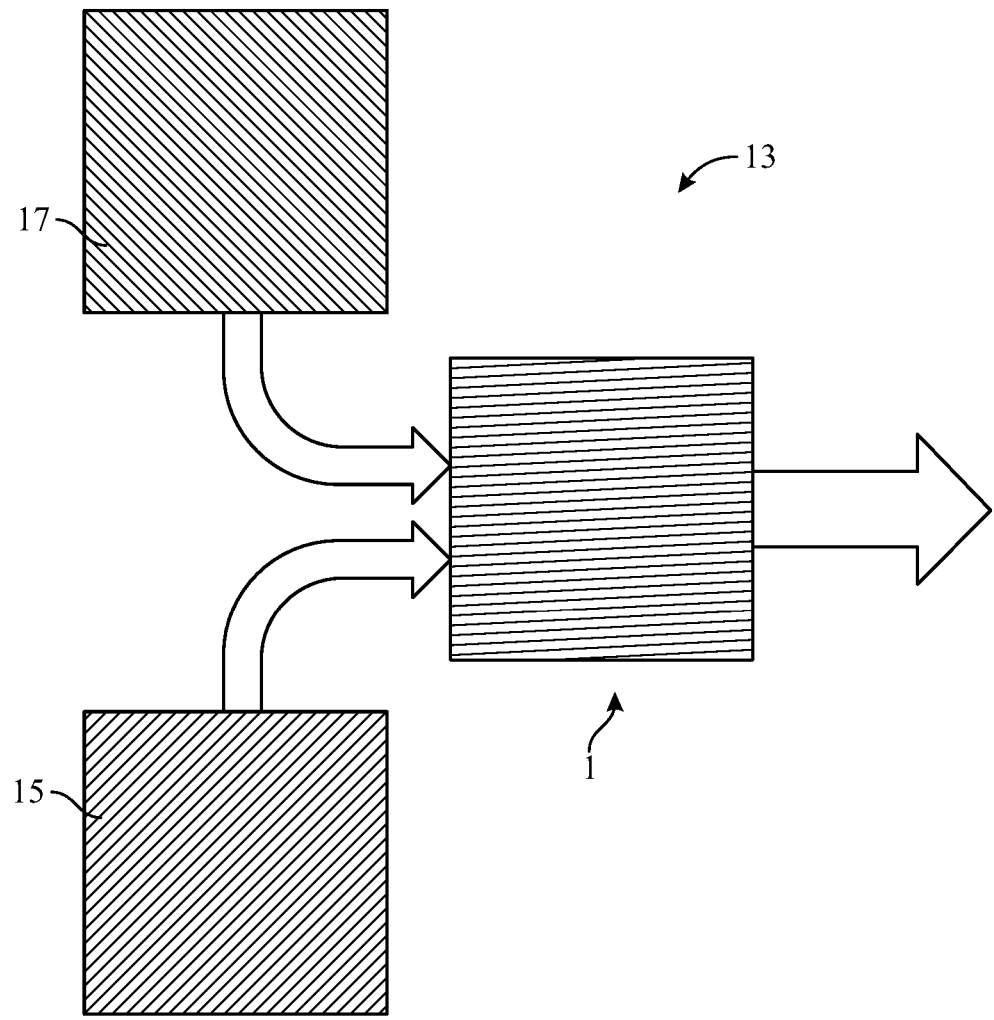
FIG. 3 is a diagrammatic representation of a system including an energy store of the type depicted in FIG. 1.

FIG. 3 is a diagrammatic representation of a system 13 embodying the teachings of the present invention. The system 13 comprises a heat source 15, such as an engine for example, that is arranged to exhaust heated heat transfer fluid (such as air, for example) through an exhaust that is coupled, optionally via a manifold, to the inlet of the energy store 1. Heat energy from the heated exhaust transfers from the exhaust to the PCM within the receptacles as the exhaust travels through the energy store and out of the outlet.

Once the PCM has been heated, a heat transfer fluid pump 17 can be operated to drive relatively cooler heat transfer fluid into the inlet of the energy store. That cooler heat transfer fluid extracts heat from the PCM as it passes through energy store. In this way, heat energy that would otherwise be lost can be captured, stored and reused. In one envisaged implementation of the teachings of the invention, the store 1, heat source 15 and fluid pump 17 may be part of an integrated unit. Heat transfer fluid from the engine and pump may be directed to the energy store via discrete pathways or a single common pathway.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the spirit and scope of the invention.

It should also be noted that whilst particular combinations of features have been described herein, the scope of the present invention is not limited to the particular combinations herein described, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 U.S.C. Sec. 112, par. 6. In particular, the use of "step of" in the claims appended hereto is not intended to invoke the provisions of 35 U.S.C. Sec. 112, par. 6.

The invention claimed is:

1. A modular thermal energy store configured for assembly with another like modular thermal energy store to form a stacked series array of modular thermal energy stores or back-to-back with another like modular thermal energy store to form a parallel array of modular thermal energy stores; said modular thermal energy store comprising:

a housing having a first, second, third and fourth walls; said first wall being coupled at opposite extremities to said second and third walls, respectively; said fourth wall being coupled at opposite extremities to said second and third walls, respectively; said first, second, third and fourth walls co-operating to define: (i) an internal chamber, (ii) an inlet adjacent a first periphery of said first, second, third and fourth walls, and (iii) an outlet adjacent a second periphery of said first, second, third and fourth walls opposite said first periphery;

a plurality of receptacles provided within the internal chamber and spaced from one another so that heat transfer fluid can flow over and around the receptacles as the fluid moves from the inlet to the outlet; each said receptacle defining an internal cavity for storage of phase change material (PCM) so that thermal energy can transfer between the stored PCM material and the heat transfer fluid as the fluid passes over and between the receptacles from said inlet to said outlet;

first and second structural features extending outwardly from the first and second peripheries respectively of said second, third and fourth walls, said first and second structural features being configured so that said modular thermal energy store can be assembled in a stack with a like modular thermal energy store so that said outlet of said modular thermal energy store aligns with and is adjacent to said inlet of said like modular thermal energy store; and third and fourth structural features extending outwardly from opposite third and fourth peripheries, respectively, of said first wall; said third and fourth structural features being configured so that said modular thermal energy store can be assembled back-to-back with a like modular thermal energy store so that said first wall of said modular thermal energy store abuts said first wall of said like modular thermal energy store, wherein said fourth wall defines an opening for accessing openable ports by means of which PCM can be poured into said receptacles.

2. The modular thermal energy store according to claim 1, wherein a plurality of said receptacles are coupled together so that PCM can flow between respective internal cavities of coupled receptacles.

3. The modular thermal energy store according to claim 1, wherein the modular thermal energy store is of a material that is resistant to action of heat.

4. The modular thermal energy store according to claim 3, wherein said modular thermal energy store is of an alloy.

5. The modular thermal energy store according to claim 1, wherein said modular thermal energy store is manufactured using an additive manufacturing technique.

6. The modular thermal energy store according to claim 1, wherein the modular thermal energy store is configured for storing heat at temperatures between 100 and 1000 degrees centigrade.

7. The modular thermal energy store according to claim 1, wherein at least some of said receptacles are provided with vanes or fins to enhance energy transfer between the PCM and the heat transfer fluid.

8. A thermal energy storage array comprising a plurality of modular thermal energy stores according to claim 1 stacked one on top of another.

9. A thermal energy storage array comprising a plurality of modular thermal energy stores according to claim 1 arranged side-by-side.

10. A system comprising:
a heat source having an exhaust through which heated heat transfer fluid is exhausted;
a modular thermal energy store according to claim 1 arranged so that said inlet is coupled to said exhaust, heat from the heated heat transfer fluid from said heat source being transferred to said PCM in use; and
a fluid pump coupled to said energy store for pumping heat transfer fluid that is cooler than said exhausted heat transfer fluid into said modular thermal energy store for transfer of heat energy from said PCM to raise a temperature of the heat transfer fluid that is cooler than said exhausted heat transfer fluid.

11. Modular storage means for thermal energy, said modular storage means comprising:
housing means defining an internal chamber having inlet means and outlet means; said housing means being configured so that a plurality of modular storage means may be installed side-by-side, a first wall of said housing means including first and second structural features laterally extending from opposite peripheries of said first wall, said structural features being configured so that a said structural feature on said modular storage means can be coupled to a like structural feature on a like second modular storage means when said modular storage means and said second modular storage means are side-by-side with respective first walls in close proximity to one another; and
a plurality of receptacle means provided within the internal chamber and spaced from one another so that heat transfer fluid can flow over and around the receptacle means as the fluid moves from the inlet to the outlet, wherein each said receptacle means defines an internal cavity for storage of phase change material (PCM) so that, in use, thermal energy can transfer between PCM material stored in said receptacle means and the heat transfer fluid as the fluid passes over and between the receptacles.

12. The modular storage means according to claim 11, wherein each of said receptacle means comprises a closable port that enables access to be had to said internal cavity for installation of PCM therein.

13. The modular storage means according to claim 11, wherein a plurality of said receptacle means are coupled together so that PCM can flow between respective internal cavities of coupled receptacles, a port being provided to enable PCM to be installed in the internal cavities of said coupled receptacles.

14. The modular storage means according to claim 11, wherein said housing means is configured so that a plurality of modular storage means may be stacked one on top of another to form an array.

15. The modular storage means according to claim 14, wherein said housing means includes a pair of peripheral structural features, a first partly surrounding said outlet means and a second partly surrounding said inlet means, said structural features being configured so that a said structural feature on said housing means can be coupled to a structural feature on a second housing means when said modular storage means and a second like modular storage means are stacked on top of one another.

16. Modular thermal energy storage means configured for assembly with another like modular thermal energy storage means to form a stacked series array of modular thermal energy storage means or back-to-back with another like modular thermal energy storage means to form a parallel array of modular thermal energy storage means; said modular thermal energy storage means comprising:
housing means having a first, second, third and fourth walls; said first wall being coupled at opposite extremities to said second and third walls, respectively; said fourth wall being coupled at opposite extremities to said second and third walls, respectively; said first, second, third and fourth walls co-operating to define: (i) an internal chamber, (ii) an inlet adjacent a first periphery of said first, second, third and fourth walls, and (iii) an outlet adjacent a second periphery of said first, second, third and fourth walls opposite said first periphery;
a plurality of receptacles provided within the internal chamber and spaced from one another so that heat transfer fluid can flow over and around the receptacles as the fluid moves from the inlet to the outlet; each said receptacle defining an internal cavity for storage of phase change material (PCM) so that, in use, thermal energy can transfer between the stored PCM material and the heat transfer fluid as the fluid passes over and between the receptacles from said inlet to said outlet;
first and second structural features extending outwardly from the first and second peripheries respectively of said second, third and fourth walls, said first and second structural features being configured so that said modular thermal energy store can be assembled in a stack with a like modular thermal energy store so that said outlet of said modular thermal energy store aligns with and is adjacent to said inlet of said like modular thermal energy store; and third and fourth structural features extending outwardly from opposite third and fourth peripheries, respectively, of said first wall; said third and fourth structural features being configured so that said modular thermal energy store can be assembled back-to-back with a like modular thermal energy store so that said first wall of said modular thermal energy store abuts said first wall of said like modular thermal energy store, wherein said fourth wall defines an opening for accessing openable ports by means of which PCM can be poured into said receptacles.

17. The modular thermal energy storage means according to claim 16, wherein at least some of said receptacles are provided with means for enhancing energy transfer between the PCM and the heat transfer fluid, said energy transfer enhancing means being in a form of vanes or fins extending from walls of said receptacles.

18. The modular thermal energy storage means according to claim 17, wherein said modular thermal energy storage means is manufactured using an additive manufacturing technique.

* * * * *